March 20, 1956  R. C. MATTHEWS ET AL  2,738,709
INTERCHANGEABLE EYEGLASS FRAME
Filed Sept. 8, 1951
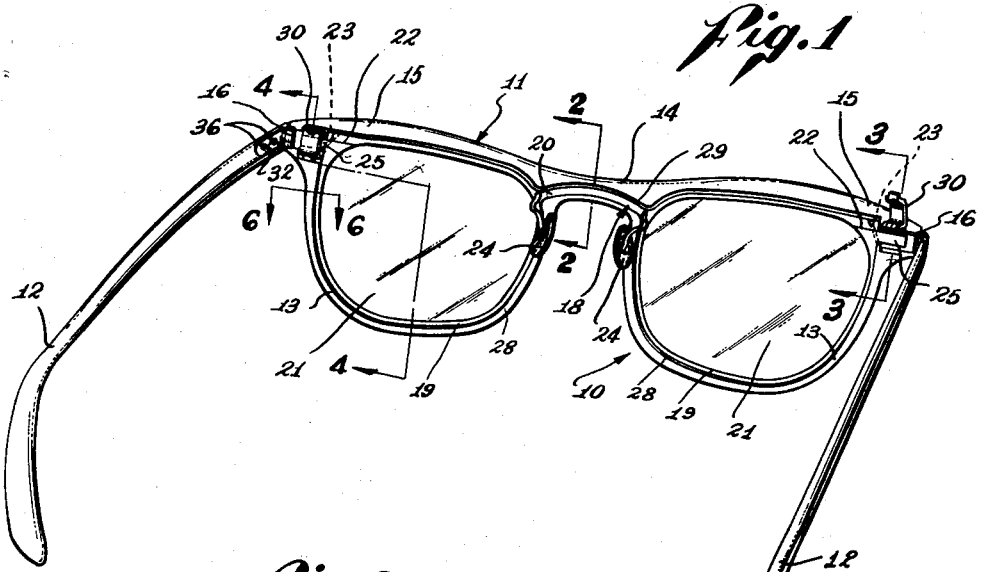
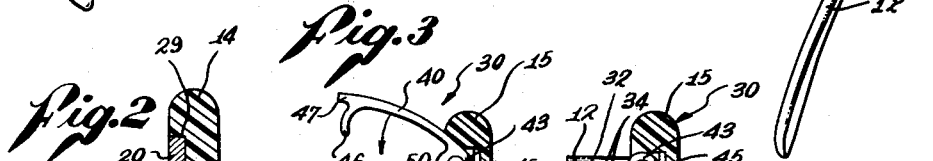
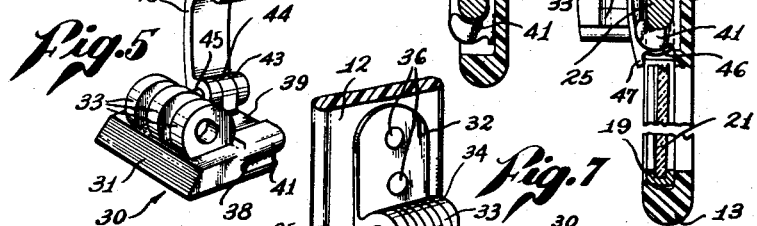
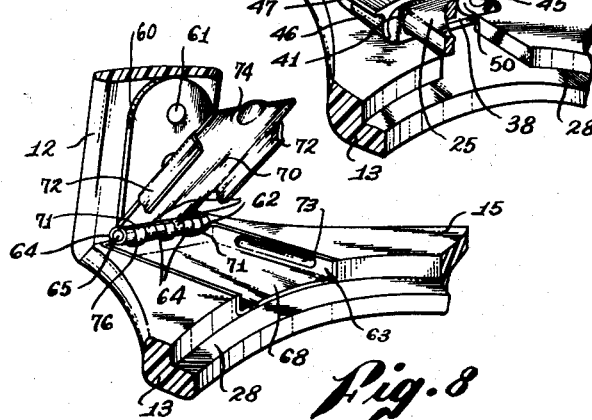
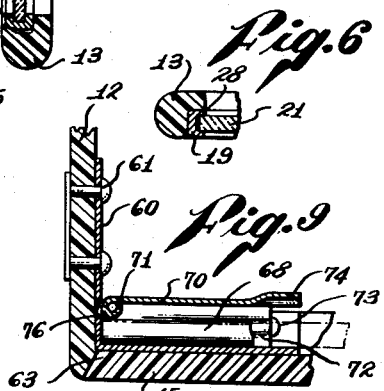
INVENTORS
CATHERINE A. HEMSING
ROSE C. MATTHEWS
BY
Fulwider & Mattingly
Attorneys

United States Patent Office 2,738,709
Patented Mar. 20, 1956

2,738,709

INTERCHANGEABLE EYEGLASS FRAME

Rose C. Matthews and Catherine A. Hemsing,
Los Angeles, Calif.

Application September 8, 1951, Serial No. 245,684

2 Claims. (Cl. 88—41)

This invention relates generally to eye glasses or spectacles, and more particularly to an eyewire construction which is adapted to be fitted in any one of a plurality of different frames.

A preferred embodiment of the invention is particularly advantageous for the wearer of corrective lenses who desires the use of different decorative frames without incurring the expense of several sets of lenses having the correct optical prescription ground therein. The composite glasses provided by the invention have the same outward appearance as those formed with conventional unitary frames and function normally for vision purposes.

One of the most difficult problems associated with the provision of satisfactory composite glasses is that of maintaining the necessary rigidity of structure and optical alignment of the lenses, and at the same time providing an eyewire construction which may be easily interchanged without requiring special skill or tools. It is also necessary to provide compact locking means which are inconspicuously positioned and are adapted to withstand repeated locking and unlocking operations without damage. As can be further appreciated, the complete device must be capable of manufacture at a nominal cost and must be able to withstand the rugged usage which might occur. Prior attempts to provide composite glasses have either been so bulky and complex as to be undesirable in appearance or of such a fragile nature as to be impractical for daily use. For these reasons, no composite glasses heretofore produced have been commercially acceptable.

Accordingly, with the foregoing in mind, it is a major object of our invention to provide improved composite eye glasses having an eyewire construction which is interchangeably fitted within any one of a plurality of decorative frames and is held securely and inconspicuously therein.

Another object of our invention is to provide a device of the character described having a rigid lens carrier which holds a pair of lenses in correct optical alignment and is easily fitted to or removed from the frame without special skill or tools.

It is a further object of our invention to provide eyewire locking means formed integrally with the temple hinges so as to be held in position by the use of the conventional securing rivets and without the necessity of additional structure.

Still another object of our invention is to provide quick-connect locking means for holding the eyewire construction in a rearward inconspicuous position within the frame, and preventing relative lateral or outward movement thereof.

It is also an object of our invention to provide locking means having a combination locking and cam structure which allows the eyewire construction to be easily seated therein, and thereafter urges the eyewires into a position of firm engagement with the frame to prevent accidental opening of the locking means or displacement from said frame.

A still further object of our invention is to provide a separable eyewire assembly and frame interlocked at spaced peripheral points about each lens upon the actuation of a single pair of locking means.

These and other objects and advantages of our invention will become apparent from the following detailed description of a preferred and alternate form thereof, and from an inspection of the accompanying drawings, in which:

Fig. 1 is a rear perspective view of a preferred embodiment of the invention;

Fig. 2 is a cross-section taken through the assembly along the line 2—2 of Fig. 1;

Fig. 3 is a cross-section taken along the line 3—3 of Fig. 1 through the eyewire locking means;

Fig. 4 is a partial cross-section taken through the upper and the lower rims of the glasses along the line 4—4 of Fig. 1;

Fig. 5 is a perspective view of the eyewire locking means in the open position;

Fig. 6 is a cross-section taken through the frame rim along line 6—6 of Fig. 1;

Fig. 7 is a perspective view of the eyewire locking means and adjacent frame channel;

Fig. 8 is a perspective view of an alternate form of eyewire locking means; and

Fig. 9 is a cross-section through the alternate form of locking means shown in Fig. 8.

Referring now to the drawings, and particularly to Fig. 1 thereof, the numeral 10 indicates generally a pair of spectacles having a flat main frame 11 which supports the optical elements and is connected to temples 12 that are adapted to extend rearwardly along the temples of the wearer. Frame 11 is preferably made of a suitable plastic material molded as a unitary rigid structure to define a pair of outer rims 13 connected centrally by a nosepiece or bridge 14. The marginal portions of frame 11 are of substantial thickness and width, as is conventional design for a modern decorative frame, and project laterally to form endpieces 15 at the outer side of each rim 13. Temples 12 are hinged to the endpieces 15 for pivotal movement in the horizontal plane by means of hinges 16.

Removably mounted within the rear face of frame 11 is an eyewire assembly 18 which comprises a pair of inner eyewires 19 joined by a reduced bridge 20, and shaped similarly to the respective frames or rims 13 and bridge 14. Eyewire assembly 18 is formed of a suitable optical metal having sufficient strength to permit eyewires 19 to be formed of relatively thin cross-section and yet sufficiently rigid to firmly hold a pair of optical lenses 21. The outer edges of eyewires 19 are split at 22 to permit the insertion of lenses 21 therein, and are locked together by a small easily removable adjustment screw 23 which is threadedly inserted from the upper rim section.

Adjacent bridge 20, a pair of nose pads 24 are mounted on eyewires 19 in spaced opposed relationship to ride upon the nose of the wearer. If desired, nose pads 24 may be formed integrally with the main frame 11, and as can be understood, the shape and style of the latter is capable of substantial change without affecting the operability of the invention. At the outer corner of each eyewire 19 an integral locking lug 25 of generally rectangular shape projects laterally a short distance in a position corresponding generally to the position of endpiece 15. Preferably, lugs 25 are formed as an integral extension of the lower eyewire section abutting the junction 22. As will later be described, lugs 25 are adapted to interlock with locking means formed integrally with the temple hinges 16, so as to hold eyewire assembly 18 firmly in position.

To receive eyewire assembly 18, a channel 28 is cut into the inner peripheral edge of each rim 13 to a depth just sufficient to take eyewires 19 and hold the same in flush alignment with the rear face of frame 11, as is best seen in Figs. 4 and 6. The vertical dimension across the channels 28 is made slightly larger than the vertical diameter of eyewires 19, so that the latter fits therein with some clearance. Across bridge 14, a similar groove 29 is cut into the rear face of the frame to take eyewire bridge 20. As is best seen in Fig. 2, groove 29 is a close fit to hold bridge 20 inwardly by frictional engagement. Thus, eyewire assembly 18 is quickly positioned within frame 11 by seating eyewires 19 in the slightly oversized channels 28 and simultaneously snapping the bridge 20 into groove 29 with a slight push.

As this is done, lugs 25 seat within locking means 30 which lie immediately adjacent the hinges 16. The function of locking means 30 is to hold eyewire assembly 18 firmly within frame 11 and prevent accidental displacement or misalignment thereof. To this end, lugs 25 are clamped firmly within locking means 30 and as an additional feature, the entire assembly 18 is urged downwardly to force the lower edges of the eyewires 19 into frictional engagement with the bottom wall of channels 28.

As is best seen in Fig. 7, each hinge 16 comprises a forward section or plate 31 and a side section or plate 32 secured to the endpiece 15 and temple 12, respectively. Plates 31 and 32 support projecting barrels 33 and 34 which are adapted to interlock in alternate side-by-side sequence and are rotatably journaled on a pivot pin or pintle 35. Fastening means, such as rivets 36, are used to secure the plates 31 and 32 rigidly on the frame member. The forward hinge plate 31 has an integral extension which projects inwardly along the endpieces 15 and forms a base 38 which supports the locking means 30. Base 38 has a central longitudinal slot 39 which is open rearwardly and inwardly to receive the lug 25 therein and is closable by a pivotally mounted lever 40. The lower edge of base 38 is formed as an arcuate outwardly convex keeper 41 which frictionally engages the free end of lever 40 to hold it closed and prevent outward movement of lug 25.

Lever 40 is generally rectangular and projecting inwardly from the upper edge thereof, are a pair of spaced barrels 43 which bracket an upstanding barrel 44 formed on the base 38, and are pivotally connected thereto by means of a short transverse pivot pin 45. The lower edge of lever 40 carries a convex hook or latch 46 which is adapted to override the exterior of keeper 41 and engage frictionally thereon. To facilitate opening of cover 40 with the thumb or finger, a small flange or lip 47 is extended outwardly from latch 46 in an easily accessible position.

As is best seen in Figs. 3 and 4, the width of slot 39 is slightly greater than the width of lug 25 to permit the lug 25 to be freely inserted therein with the lever in the open position. Thereafter, when lever 40 is closed, lug 25 is shifted slightly downwardly by cam surfaces or eccentrics 50 formed on barrels 43. The relative angular position of cams 50 is such that they are spaced from lug 25 in the open position of lever 40 as seen in Fig. 3, and are rotated inwardly to bear downwardly against the lug as the lever is closed to the position of Fig. 4. The interior wall of keeper 41 is concave to receive and confine the lower edge of lug 25 when it is shifted downwardly under the urging of cams 50.

In the closed position of lever 40, as seen in Fig. 4, it should be noted that lug 25 does not bear outwardly against the lever, but is held against outward movement by the concave surface of keeper 41. Thus, any force which acts to push the lug 25 out of the slot 39 acts only against keeper 41 and has no tendency to open lever 40 or cause accidental displacement of eyewire assembly 18. This is an important feature of the invention, and makes feasible the use of composite glasses for continuous daily service.

To further interlock assembly 18 to frame 11, we utilize the downward shifting movement of lugs 25 to cause engagement between the lower edge of eyewire 19 and rim channels 28. As is seen in Fig. 4, the central bottom sections of rim channels 28 are dished inwardly with a curvature corresponding generally to that of keeper 41 so as to receive and confine the eyewire 19 therein. As will be remembered, channels 28 are slightly larger than eyewires 19 to permit the easy insertion of the assembly 18 therein, while the bridge 20 is tightly engaged with the central bridge groove 29. When cams 50 act to shift lugs 25 downwardly, the bridge 20 yields slightly to permit the eyewires 19 to be forced downwardly into firm engagement with the lower portions of channels 28. Thus, it can be seen that in the installed position, the assembly 18 is held centrally along bridge 20, is held at the upper outer corners by locking lugs 25, and is additionally held along the lower edges of eyewires 19. This multiple interlocking between the frame 11 and eyewire assembly 18 prevents separation therebetween, and provides a rigid unitary structure which maintains the correct optical alignment of lenses 21.

In Figs. 8 and 9, we have shown an alternate form of locking means which is generally similar to the form just described, but has a slightly different construction of the locking cover. As seen in Fig. 8, a flat hinge section or plate 60 is secured to temple 12 by rivets 61 and carries a plurality of spaced barrels 62 across its lower end. Endpiece 15 supports a generally rectangular hinge section or base 63 which is formed with a plurality of barrels 64 adapted to interleaf with barrels 62 and be pivotally connected thereto by pivot pin 65. The interior of base 63 is longitudinally slotted to form an open chamber or slot 68 which is adapted to receive the locking lug 25. A flat cover plate 70 is pivotally mounted above slot 68 and may be moved downwardly to confine the lug 25 and prevent displacement of assembly 18.

Cover plate 70 in this form of the invention is supported by the same pivot pin 65 which connects hinge members 60 and 63. For mounting on pin 65 a plurality of spaced barrels 71 are formed on the outer end of plate 70 in such position as to interleaf between the barrels 62 and 64 of the hinge members. This construction permits free pivotal movement and allows cover 70 to be pivotally moved from the open position of Fig. 8 to the closed position in Fig. 9. To lock cover plate 70 in the downward position, side hooks or latches 72 project downwardly in spaced opposed relationship and are adapted to engage frictionally within keepers or detents 73 formed in the side walls of base member 63. At the free end of cover 70, a raised lip 74 may be provided to facilitate opening of the cover.

Again, in this form of the invention, it is preferable that lugs be held inwardly by means other than the cover 70 so that the latter cannot be accidentally forced open. Eccentrics or raised cams 76 are formed on the cover barrels 71 for this purpose and are adapted to move pivotally with the cover plate 70. When cover 70 is closed into the position of Fig. 9, cams 76 rotate downwardly to bear directly against lug 25 and hold it against base 63. In this position, cams 76 are substantially perpendicular to the surface of lug 25, and upward pressure exerted by the lug does not create a rotational moment tending to cause pivotal opening of the cover 70. As can be appreciated, this form of the invention has a somewhat simpler construction than the preferred form of the device and may therefore be advantageous for certain types of glasses.

While we have thus described preferred and alternate forms of our invention, which are fully capable of carrying out the aforementioned objects and advantages, it is to be understood that modifications in design and construction will be apparent to those skilled in the art. Therefore, we do not wish to be limited to the details described herein, except as defined in the appended claims.

We claim:

1. In an ophthalmic mounting a front frame, endpieces projecting from said frame, a pair of temples hingedly secured to said endpieces, a pair of eyewires, a bridge piece connecting said eyewires together, an outwardly projecting lug carried by each eyewire, and latching means fixed relative to said endpieces engageable with said lugs releasably locking the latter relative to said endpieces, said latching means comprising a base plate, a hinge barrel at one end of said plate, a keeper projecting rearwardly from the other end of said plate, said keeper having a concave inner side and a convex outer side, a lever, hinge barrels carried by said lever, a pintle extending through said first and second named hinge barrels, an arcuate catch carried by said lever engaging over the convex outer side of said keeper, and cam means carried by said second named hinge barrels engaging with an edge of a lug whereby to tightly bind said lug in the concave inner side of said keeper.

2. In an ophthalmic mounting a front frame, endpieces projecting from said frame, a pair of temples hingedly secured to said endpieces, a pair of eyewires, a bridge piece connecting said eyewires together, an outwardly projecting lug carried by each eyewire, and latching means fixed relative to said endpieces engageable with said lugs releasably locking the latter relative to said endpieces, said latching means comprising a base plate, at least one hinge barrel at one end of said plate, a keeper projecting rearwardly from the other end of said plate, a lever, hinge barrels carried by said lever, a pintle extending through said first and second named hinge barrels, a catch carried by said lever releasably engageable with said keeper, and cam means carried by said second named hinge barrels engageable with an edge of said lug whereby to tightly bind the opposite edge of said lug relative to said keeper.

References Cited in the file of this patent

UNITED STATES PATENTS

| | | |
|---|---|---|
| 2,041,638 | Emons | May 19, 1936 |
| 2,284,630 | Banks | June 2, 1942 |
| 2,452,159 | Small | Oct. 26, 1948 |
| 2,495,508 | Cleaver | Jan. 24, 1950 |
| 2,524,140 | Retz | Oct. 3, 1950 |
| 2,577,380 | Stegeman | Dec. 4, 1951 |
| 2,627,783 | Splaine | Feb. 10, 1953 |
| 2,652,746 | Shanks | Sept. 22, 1953 |

FOREIGN PATENTS

| | | |
|---|---|---|
| 463,000 | Great Britain | Mar. 19, 1937 |